Figure 1:
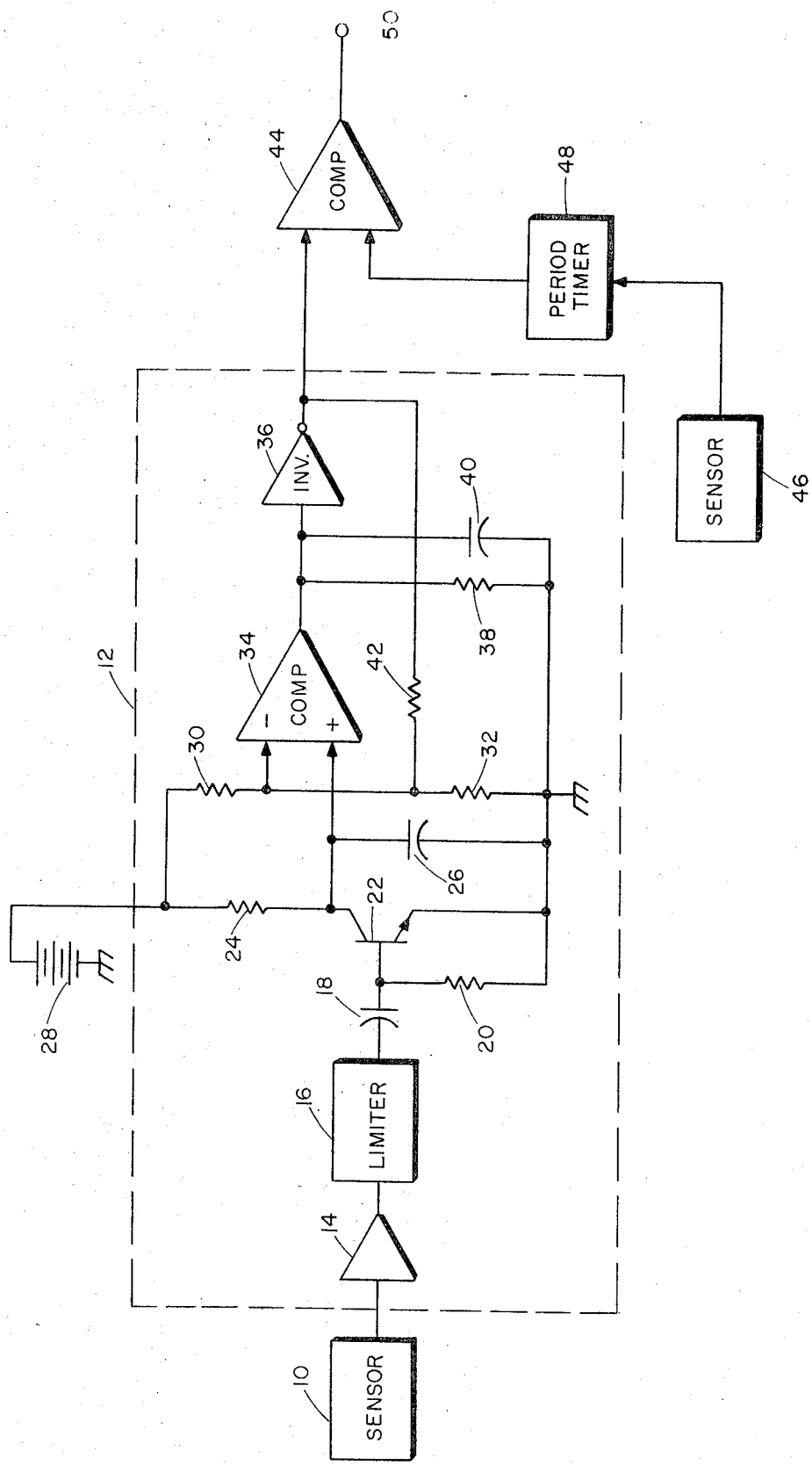

United States Patent [19]

Carp et al.

[11] 3,852,616

[45] Dec. 3, 1974

[54] FREQUENCY SELECTION BY PERIOD TIMING

[75] Inventors: Ralph W. Carp; Harold E. Weissler, II, both of Newport News, Va.; Gale F. Krawczak, Grafton, Ohio

[73] Assignee: The Bendix Corporation, Southfield, Mich.

[22] Filed: Feb. 21, 1973

[21] Appl. No.: 334,330

[52] U.S. Cl. .................. 307/233, 328/127, 328/133
[51] Int. Cl. .......................................... H03k 17/00
[58] Field of Search .......................... 307/233–234; 328/133, 158, 127; 303/21 B, 21 BE; 188/181 A, 181 C; 324/161

[56] References Cited
UNITED STATES PATENTS

| | | | |
|---|---|---|---|
| 3,549,903 | 12/1970 | Lowdenslager | 307/233 |
| 3,581,220 | 5/1971 | Bell | 307/233 |
| 3,594,588 | 7/1971 | Evans | 307/233 |
| 3,661,428 | 5/1972 | Sharp | 307/233 |
| 3,735,257 | 5/1973 | Roesner | 307/233 |

Primary Examiner—Rudolph V. Rolinec
Assistant Examiner—B. P. Davis
Attorney, Agent, or Firm—W. G. Christoforo; Bruce L. Lamb

[57] ABSTRACT

A period timer for use in an adaptive braking system determines when wheel speed falls below a reference speed and when wheel speed subsequently exceeds a second, higher, reference speed. A capacitor is charged to a voltage inversely proportional to wheel speed. If the capacitor voltage exceeds a reference voltage proportional to the reference speed a one-shot generates an output which is fed back to lower the reference voltage.

10 Claims, 1 Drawing Figure

FREQUENCY SELECTION BY PERIOD TIMING

BACKGROUND OF THE INVENTION

This invention relates to period timers and more particularly such timers that determine on a cycle-by-cycle basis when an input frequency falls below a first reference frequency and when the input frequency subsequently exceeds a second, higher, reference frequency. The invention is shown as particularly adapted for use in adaptive braking systems.

In adaptive braking systems for wheeled vehicles, particularly adaptive braking systems for trucks, the rotational speed of certain vehicle wheels is sensed to produce an electrical signal whose frequency is proportional to actual or equivalent wheel rotational speed or, more simply, wheel speed. This signal proportional to wheel speed is normally termed a speed signal. In one mode of operation of adaptive braking systems the speed signal from two wheels, usually on different sides of the vehicle, are compared with one another to determine whether one wheel is rotating substantially slower than the other wheel. For example, if the rotational speed of one wheel on a braked vehicle should drop below some first reference speed while the rotational speed of the second wheel remained above the reference speed, the adaptive braking system would interpret this situation as indicating that lock up of at least the slower rotating wheel is imminent. The adaptive braking system would in this case take action to automatically release the braking pressure on at least the slower rotating wheel until its speed had exceeded some predetermined threshold, usually the second aforementioned reference speed, at which time braking pressure would be reapplied.

Wheel speed is normally sensed by a tachometer which is drivenly coupled to the wheel and which generates an electrical signal output whose frequency is proportional to wheel rotational speed. Other means for determining wheel speed are also known, for example, doppler radar systems which produce a doppler frequency proportional to wheel rotational speed and also magnetic transducers located on the frame of the vehicle and which respond to a rotating magnetic field disturbance produced by means attached to the rotating wheel. In any event, the speed signal is an electrical signal having a frequency proportional to the wheel rotational speed. Generally, the speed signal is then integrated to produce a d-c voltage proportional to wheel rotational speed and the d-c voltage compared with a reference d-c voltage related to a reference speed, in a comparator having hysteresis, to provide frequency selection. Integration was normally performed in a frequency counter. Since changes in the d-c voltage proportional to wheel rotational speed were analyzed in the adaptive braking system to produce signals related to wheel acceleration and deceleration and since these acceleration and deceleration signals were further used by the adaptive braking system in certain modes of operation to automatically control vehicle braking, the counter was required to cover an extremely broad frequency band with resultant poor speed resolution. This was especially true since the counter was required to integrate speed signals produced by wheels traveling at 100 miles an hour at its upper end down to speed signals produced by wheels traveling at 5 miles an hour at its lower end. In addition, since a counting operation was involved there was a delay in the response of the counting circuit.

SUMMARY OF THE INVENTION

The present invention is a period timer which provides on a cycle-by-cycle basis an indication when an input frequency signal falls below a first reference frequency and subsequently exceeds a second, higher reference frequency. The input signal is amplified and limited so as to produce a pulse train, normally in the form of a square wave having a pulse repetition frequency equal to the frequency of the input signal. In this embodiment, each positive excursion of the pulse train discharges a capacitor which otherwise accumulates charges from an electrical source. The voltage across the capacitor immediately prior to discharge is thus related to the period of the input frequency signal on a cycle-by-cycle basis. The instantaneous voltage across the capacitor is compared in a comparator against a reference voltage related to a first reference frequency. If, before the capacitor is discharged, its voltage exceeds the reference voltage, the comparator generates an output which triggers a retriggerable one-shot. The one-shot output pulse is fed back to lower the reference voltage during the period of the output pulse.

The invention has particular application in an adaptive braking system where the input frequency signal is a frequency proportional to wheel rotational speed. In normal operation, the circuit of the invention is not effective until the vehicle brakes are applied. In addition, the speed signal from at least a second vehicle wheel is applied to another similar or identical period timer and the outputs thereof compared. If, after the brakes are applied, the comparison shows that the speed of one wheel has dropped below the lower reference while the speed of the other wheel has remained above the reference, an output is generated which is applied to release the braking pressure on at least the slower moving wheel. Thereafter, of course, the slow wheel will speed up. When the speed signal subsequently exceeds the second reference the adaptive braking system operates to automatically restore braking force. In a practical adaptive braking system a further timer is provided which is started when braking force is released and which automatically restores braking force if the speed signal does not exceed the second reference within a predetermined time. It is thus an object of this invention to provide a period timer which indicates on a cycle-by-cycle basis when an input frequency signal falls below a lower reference frequency or subsequently exceeds a higher reference frequency.

Another object of this invention is to provide a period timer particularly adapted for use in an adaptive braking system for wheeled vehicles.

The FIGURE is a modified schematic of the invention.

Refer to the FIGURE wherein a sensor 10 is coupled to a vehicle wheel and generates an electrical output signal having a frequency proportional to wheel rotational speed. Although only a single sensor is shown here it should be understood that multiple sensors might be involved, as for example, in select high or select low systems where the rotational speed of more than one wheel is sensed, each by its own sensor, and only the speed signal of a wheel meeting certain instantaneous dynamic criteria chosen. These type systems are well known and need not be further mentioned here. In any event, the invention contemplates that a speed signal is available. This wheel speed signal is applied to a period timer 12, and more particularly to an amplifier 14 and limiter 16 which amplifies and limits the input signal to produce at the output of the limiter a pulse train, which in this embodiment is a square wave, having a pulse repetition frequency proportional to the frequency of the input signal. The pulse train is differentiated by a differentiator comprised of a capacitor 18 connected between the output of the limiter and the base electrode of NPN transistor 22, whose emitter electrode is connected to ground. The differentiator also includes resistor 20 connected between the base electrode of transistor 22 and ground. The collector electrode of transistor 22 is connected as one input to comparator 34 and also connected through resistor 24 to the positive terminal of a d-c power supply 28 whose other terminal is grounded. Resistor 24 together with capacitor 26 which is connected across the collector-emitter circuit of transistor 22 comprises an RC network in which capacitor 26 is charged from d-c power supply 28. A voltage divider comprised of resistors 30 and 32 is connected across the d-c power supply. The voltage at the junction of these two resistors is applied as a reference to comparator 34 while the voltage across capacitor 26 is applied as a second input to comparator 34. The comparator, in this embodiment, is capable of sourcing current but not sinking current at its output terminal. When the voltage across capacitor 26 exceeds the reference the comparator generates an output voltage which is impressed across capacitor 40. Capacitor 40 together with shunt resistor 38 and inverting threshold 36 comprise a one-shot in which the input impedance of inverting threshold 36 is high so that capacitor 40 must discharge through resistor 38. Thus, the period of the one-shot output pulse is generally determined by the values of capacitor 40 and resistor 38. Inverting threshold 36 generates a negative going output, which output is the one-shot output signal, so long as the signal at its input terminal (voltage across capacitor 40) is above the threshold. The one-shot output signal is fed back through resistor 42 to the junction of resistors 30 and 32 to lower the reference voltage input to comparator 34.

In operation, the pulse train output of limiter 16 is differentiated and then applied to the base electrode of transistor 22. The positive excursions of the pulse train cause the transistor to conduct, thus discharging capacitor 26. Thereafter, capacitor 26 charges through resistor 24. If comparator 34 should now generate an output it indicates that the speed of the sensed wheel has dropped below the reference. Assuming this is so, the one-shot output signal feedback lowers the reference to a new level so that so long as the speed of the sensed wheel remains below this new level, comparator 34 will continue to generate an output for each cycle of the pulse train. This continued output triggers the one-shot by recharging capacitor 40. However, if the wheel speed increases to the point where the voltage across capacitor 26 cannot build up to the new reference level, the comparator will not be retriggered and capacitor 40 will eventually bleed off through resistor 38 so that the signal at the input of inverting threshold 36 drops below the threshold. When this occurs output signal from the one-shot goes high and the first reference voltage is restored.

As previously mentioned, the invention is particularly suitable for use in an adaptive braking system where another sensor 46, similar to sensor 10, is coupled to another vehicle wheel and generates a frequency signal whose frequency is proportional to the later wheel's speed. A second period timer 48 similar or identical to period timer 12 receives the frequency signal from sensor 46 and applies its output to a comparator 44 together with the output from period timer 12. Comparator 44 will generate an output at terminal 50 which can be used by the adaptive braking system to relieve vehicle braking force whenever the speed of one wheel falls below the first reference while the speed of the second wheel is above the reference and to restore braking force when the speed of previously slower wheel subsequently exceeds a second reference.

In an adaptive braking system actually used the first reference corresponds to a wheel speed of 5 mph, while the second reference corresponds to a wheel speed of 10 mph.

The invention claimed is:

1. A period timer for use in an adaptive braking system for generating an output signal when a speed represented by a speed signal falls below a first reference speed, said output signal being extinguished when the speed subsequently exceeds a second higher reference speed comprising:

means for generating an electrical pulse train having a pulse repetition frequency proportional to the speed signal;

means for generating a voltage ramp from a first voltage level toward a second voltage level;

means responsive to a predetermined, cyclically recurring point on said pulse train for returning said voltage ramp to said first voltage level;

means for generating a reference voltage level proportional to said first reference speed;

a retriggerable one-shot;

a comparator for triggering said one-shot to generate said output signal when the instantaneous value of said voltage ramp attains said reference voltage level, said output signal having at least a predetermined period; and, feedback means responsive to said output signal for altering said reference voltage level to be proportional to said second reference speed during the period of said output signal.

2. The period timer of claim 1 and with additionally:

a second period timer essentially identical to the first mentioned period timer for generating a second output signal when a speed represented by a second speed signal falls below a third reference speed represented by a third reference voltage level, and including further feedback means for altering said third reference voltage level to a fourth reference voltage level representing a fourth reference speed during the period of said second output signal, said second output signal being extinguished when the speed represented by the second speed signal subsequently exceeds the fourth reference speed; and, means for generating a brake control signal while one of the output signals is generated in the absence of the other output signal.

3. The period timer of claim 1 wherein said means for generating a reference voltage level comprises a d-c power source and a voltage divider connected thereacross, said reference voltage level being obtained from a point interior thereof, and wherein said feedback means comprises resistance means switchably connected into said voltage divider in response to said output signal.

4. A period timer for use in an adaptive braking system for wheeled vehicles for generating an output signal when the speed of a sensed wheel falls below a first speed and wherein said output signal is extinguished when the speed of the sensed wheel subsequently exceeds a second, higher, speed comprising:

means for generating an electrical wave having a pulse repetition frequency proportional to the speed of the sensed wheel;
   a d-c power supply;
   a charge storage means including a capacitor and connected across said d-c power supply for supplying charges to said capacitor whereby the voltage across said capacitor is caused to change from a first level toward a second level;
   means responsive to a predetermined cyclically recurring point on said electrical wave for temporarily shunting said capacitor;
   a voltage divider connected across said d-c power supply for generating a reference voltage level proportional to said first speed; a retriggerable one-shot;
   a comparator for triggering and retriggering said one-shot when the instantaneous value of the voltage across said capacitor attains said reference level, a resulting signal from said one-shot comprising said output signal; and,
   feedback means responsive to said output signal for changing the structure of said voltage divider so that the voltage level of said reference voltage level is altered to be proportional to said second speed during the period of said output signal.

5. The period timer of claim 4 with additionally:
   a second period timer for generating a second output signal when the speed of a second sensed wheel falls below said first speed, said second output signal being extinguished when the speed of said second wheel subsequently exceeds said second speed; and,
   means for generating a brake control signal when one of the output signals is generated in the absence of the other output signal.

6. The period timer of claim 4 wherein said comparator includes an output terminal and wherein said retriggerable one-shot comprises:
   an amplifier having an input terminal connected to said comparator output terminal and an amplifier output terminal, said output signal being generated at said amplifier output terminal;
   a second capacitor connected between said amplifier input terminal and a return terminal of said d-c power source; and,
   resistor means connected across said second capacitor.

7. The period timer of claim 6 wherein said comparator supplies current to said second capacitor when triggering and retriggering but where said comparator does not sink current into its output terminal, and wherein said amplifier is characterized by a high input impedance input terminal whereby the only effective discharge path of said second capacitor is through said resistor means.

8. The period timer of claim 7 wherein said amplifier is an inverting threshold amplifier and wherein said voltage divider includes an interior point thereof, said reference voltage level being generated at said interior point, and wherein said feedback means is connected between said interior point and said amplifier output terminal.

9. The period timer of claim 8 wherein said means for temporarily shunting said capacitor comprises:
   a transistor having a collector-emitter circuit connected across said capacitor and a base electrode; and,
   a differentiator having an input terminal connected to receive said electrical wave and an output terminal connected to said base electrode.

10. The period timer of claim 4 and with additionally:

a second period timer for generating a second output signal when the speed of a second sensed wheel falls below said first speed, said second output signal being extinguished when the speed of said second sensed wheel subsequently exceeds said second speed; and,
   means for generating a brake control signal when one of the output signals is generated in the absence of the other output signal.

* * * * *